(12) United States Patent
Silberstein et al.

(10) Patent No.: US 11,232,367 B1
(45) Date of Patent: Jan. 25, 2022

(54) APPARATUS AND METHOD FOR FORECASTED PERFORMANCE LEVEL ADJUSTMENT AND MODIFICATION

(71) Applicant: Groupon, Inc., Chicago, IL (US)

(72) Inventors: Leopold Silberstein, Chicago, IL (US); Abhaya Parthy, Palo Alto, CA (US); Boris Lerner, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 1078 days.

(21) Appl. No.: 15/840,452

(22) Filed: Dec. 13, 2017

Related U.S. Application Data

(60) Provisional application No. 62/434,161, filed on Dec. 14, 2016.

(51) Int. Cl.
 *G06N 7/00* (2006.01)
 *G06F 16/25* (2019.01)

(52) U.S. Cl.
 CPC ........... *G06N 7/005* (2013.01); *G06F 16/258* (2019.01)

(58) Field of Classification Search
 CPC ............................... G06F 7/005; G06F 16/258
 See application file for complete search history.

(56) References Cited

U.S. PATENT DOCUMENTS

| | | | | |
|---|---|---|---|---|
| 6,606,615 B1 * | 8/2003 | Jennings | ............... | G06Q 10/06 706/45 |
| 10,748,072 B1 * | 8/2020 | Seeger | ................... | G06N 7/005 |
| 2007/0162329 A1 * | 7/2007 | Lee | .................... | G06Q 30/0272 705/14.47 |
| 2011/0208701 A1 * | 8/2011 | Jackson | .............. | G06F 16/2445 707/687 |
| 2012/0323677 A1 * | 12/2012 | Bottou | ................... | G06N 7/005 705/14.45 |
| 2013/0030907 A1 * | 1/2013 | Lyon | .................. | G06Q 30/0277 705/14.42 |
| 2014/0222653 A1 * | 8/2014 | Takayasu | ............... | G06Q 40/04 705/37 |
| 2016/0189176 A1 * | 6/2016 | Newnham | .............. | G06Q 30/00 705/7.31 |
| 2016/0292196 A1 * | 10/2016 | Yan | ..................... | G06K 9/00557 |
| 2019/0294740 A1 * | 9/2019 | Matsubara | .............. | G06F 30/20 |

* cited by examiner

*Primary Examiner* — Daniel T Pellett
(74) *Attorney, Agent, or Firm* — Alston & Bird LLP

(57) ABSTRACT

An apparatus, method, and computer program product are provided to adjust and modify input signals used in connection with predictive models by detecting events, such as changes in operating parameters of data objects and/or related systems and calculating adjusted decay rates to be applied to time-series data associated with times prior to an occurrence of an event. In some example implementations, an indication of an event associated with a given datastream is received, in a manner which indicates the change in an operating parameter and the time at which the change occurred. Based at least in part on the indication of the event associated with the datastream, a second decay rate associated with the set of time-series data is determined and applied to the set of time-series data, such that an updated future performance level can be calculated by a predictive model.

20 Claims, 4 Drawing Sheets

APPARATUS AND METHOD FOR FORECASTED PERFORMANCE LEVEL ADJUSTMENT AND MODIFICATION

CROSS-REFERENCE TO RELATED APPLICATIONS

This application claims the benefit of U.S. Provisional Application No. 62/434,161, titled "Apparatus and Method for Forecasted Performance Level Adjustment and Modification," filed Dec. 14, 2016, which is incorporated by reference herein in its entirety.

TECHNICAL FIELD

An example embodiment relates generally to systems and methods that allow for adjusting and modifying a forecasted performance level of a data object in an efficient manner. Example implementations are particularly directed to systems, methods, and apparatuses for adjusting and modifying forecasted performance levels associated with option data objects by detecting performance-related events and calculating adjusted decay rates associated with time-series data prior to an occurrence of the event.

BACKGROUND

The use of powerful predictive models that are capable of processing past data object performance data and predicting future data object performance characteristics has become increasingly popular, particularly in network environments that feature large volumes of option data objects and large populations of independent users and sources of option data objects, and where the characteristics and/or performance of an option data object is subject to change or alteration based on the occurrence of one or more events. The inventors of the invention disclosed herein have identified a number of technical and operational challenges to be addressed in such environments, and have developed the solutions disclosed herein to overcome such challenges.

BRIEF SUMMARY

An apparatus, computer program product, and method are therefore provided in accordance with an example embodiment in order to permit effectively adjusting and modifying a forecasted performance level of an option data object based on the detection of an occurrence of an event associated with the option data object. In this regard, the method, apparatus and computer program product of an example embodiment provide for the calculation of one or more adjusted decay rates associated with time-series data based on an indication of an event occurrence associated with an option data object and applying adjusted decay rates to portions of time-series data associated the relevant option data object.

In an example embodiment, an apparatus is provided, the apparatus comprising at least one processor and at least one memory coupled to the processor, wherein the processor is configured to at least: receive, via a first channel, a datastream, wherein the datastream comprises a set of time-series data associated with a performance level of a system; calculate a first forecasted performance level, wherein the calculation of the first forecasted performance level is based at least in part on: a portion of the time-series data associated with a predetermined period of time and a first decay rate associated with the set of time-series data; receive an indication of an event associated with the datastream, wherein the indication of the event comprises: an identification of a change in an operating parameter of the system and an identification of a time at which the change in the operating parameter of the system occurred; based at least in part on receiving the indication of the event associated with the datastream, determine a second decay rate associated with the set of time-series data; and calculate a second forecasted performance level, wherein calculating the second forecasted performance level comprises applying the second decay rate to a portion of the time-series data, wherein the portion of the time-series data is associated with a time period prior to the time at which the change in the operating parameter of the system occurred.

In some example implementations of such an apparatus, the set of times series data associated with a performance level of a system comprises a conversion rate associated with an option data object. In some such example implementations, and in other example implementations, the conversion rate associated with the option data object is determined based at least in part on a comparison between a quantity of conversions of the data object and a quantity of presentations of the option data object to one or more users of the system.

In some example implementations, the change in an operating parameter of the system comprises a change in an aspect of the option data object. In some such example implementations, the first calculated performance level comprises a first anticipated conversion rate associated with the option data object. In some such example implementations, the second calculated performance level comprises a second anticipated conversion rate associated with the option data object.

In some example implementations, applying the second decay rate to a portion of the time-series data, wherein the portion of the time-series data is associated with a time period prior to the time at which the change in the operating parameter of the system occurred comprises reducing a weight associated with the portion of the time-series data.

In another example embodiment, a computer program product is provided, the computer program product comprising at least one non-transitory computer-readable storage medium having computer-executable program code instructions stored therein, the computer-executable program code instructions comprising program code instructions configured to: receive, via a first channel, a datastream, wherein the datastream comprises a set of time-series data associated with a performance level of a system; calculate a first forecasted performance level, wherein the calculation of the first forecasted performance level is based at least in part on: a portion of the time-series data associated with a predetermined period of time and a first decay rate associated with the set of time-series data; receive an indication of an event associated with the datastream, wherein the indication of the event comprises: an identification of a change in an operating parameter of the system and an identification of a time at which the change in the operating parameter of the system occurred; based at least in part on receiving the indication of the event associated with the datastream, determine a second decay rate associated with the set of time-series data; and calculate a second forecasted performance level, wherein calculating the second forecasted performance level comprises applying the second decay rate to a portion of the time-series data, wherein the portion of the time-series data is associated with a time period prior to the time at which the change in the operating parameter of the system occurred.

In some example implementations of such a computer program product, the set of times series data associated with a performance level of a system comprises a conversion rate associated with an option data object. In some such example implementations, and in other example implementations, the conversion rate associated with the option data object is determined based at least in part on a comparison between a quantity of conversions of the data object and a quantity of presentations of the option data object to one or more users of the system.

In some example implementations, the change in an operating parameter of the system comprises a change in an aspect of the option data object. In some such example implementations, the first calculated performance level comprises a first anticipated conversion rate associated with the option data object. In some such example implementations, the second calculated performance level comprises a second anticipated conversion rate associated with the option data object.

In some example implementations, applying the second decay rate to a portion of the time-series data, wherein the portion of the time-series data is associated with a time period prior to the time at which the change in the operating parameter of the system occurred comprises reducing a weight associated with the portion of the time-series data.

In another example embodiment, a method for adjusting and modifying a forecasted performance level of a system, the method comprising: receiving, via a first channel, a datastream, wherein the datastream comprises a set of time-series data associated with a performance level of a system; calculating a first forecasted performance level, wherein the calculation of the first forecasted performance level is based at least in part on: a portion of the time-series data associated with a predetermined period of time and a first decay rate associated with the set of time-series data; receiving an indication of an event associated with the datastream, wherein the indication of the event comprises: an identification of a change in an operating parameter of the system and an identification of a time at which the change in the operating parameter of the system occurred; based at least in part on receiving the indication of the event associated with the datastream, determining a second decay rate associated with the set of time-series data; and calculating a second forecasted performance level, wherein calculating the second forecasted performance level comprises applying the second decay rate to a portion of the time-series data, wherein the portion of the time-series data is associated with a time period prior to the time at which the change in the operating parameter of the system occurred.

In some example implementations of such a method, the set of times series data associated with a performance level of a system comprises a conversion rate associated with an option data object. In some such example implementations, and in other example implementations, the conversion rate associated with the option data object is determined based at least in part on a comparison between a quantity of conversions of the data object and a quantity of presentations of the option data object to one or more users of the system.

In some example implementations, the change in an operating parameter of the system comprises a change in an aspect of the option data object. In some such example implementations, the first calculated performance level comprises a first anticipated conversion rate associated with the option data object. In some such example implementations, the second calculated performance level comprises a second anticipated conversion rate associated with the option data object.

In some example implementations, applying the second decay rate to a portion of the time-series data, wherein the portion of the time-series data is associated with a time period prior to the time at which the change in the operating parameter of the system occurred comprises reducing a weight associated with the portion of the time-series data.

BRIEF DESCRIPTION OF THE DRAWINGS

Figure 1:
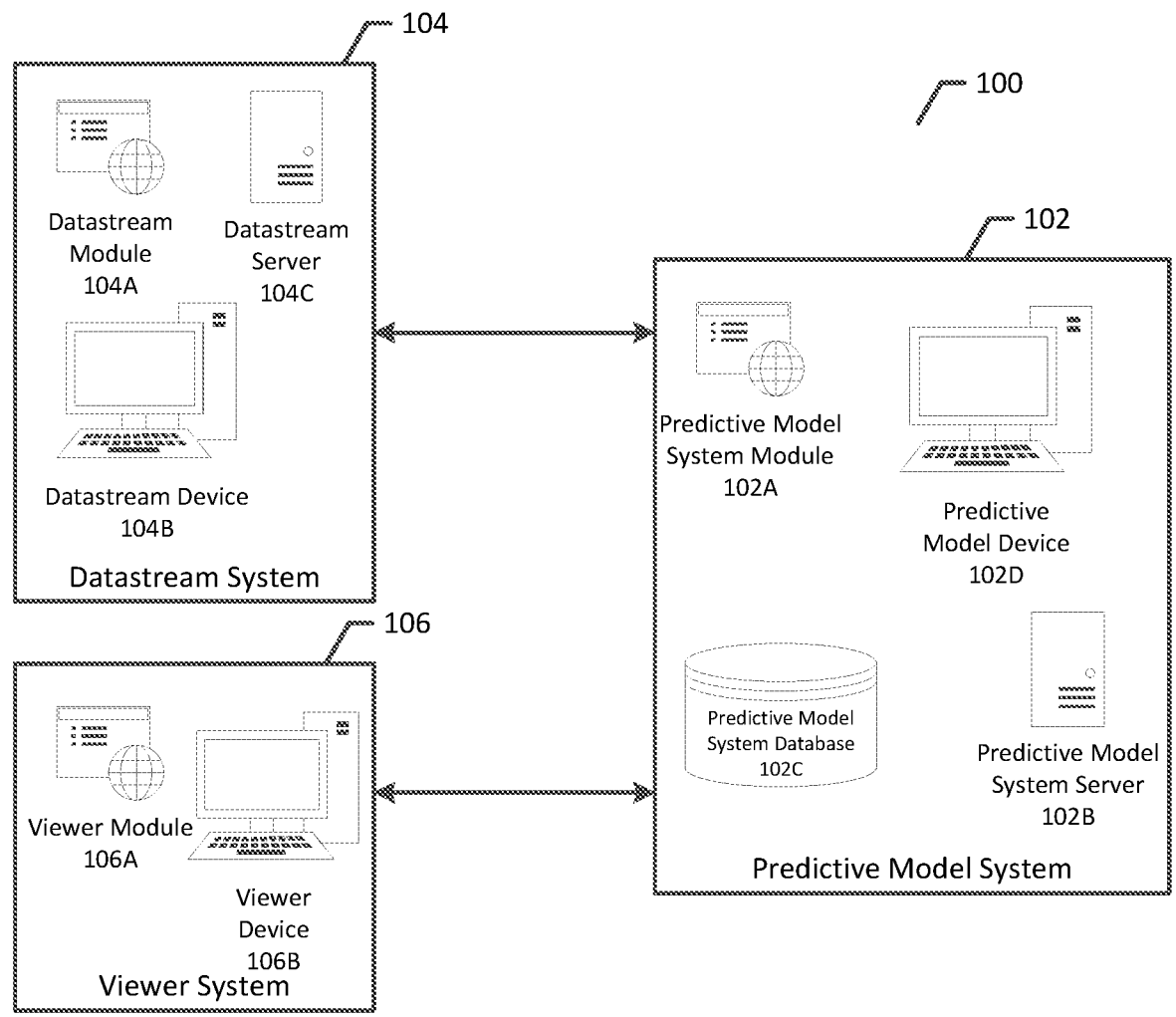
Figure 2:
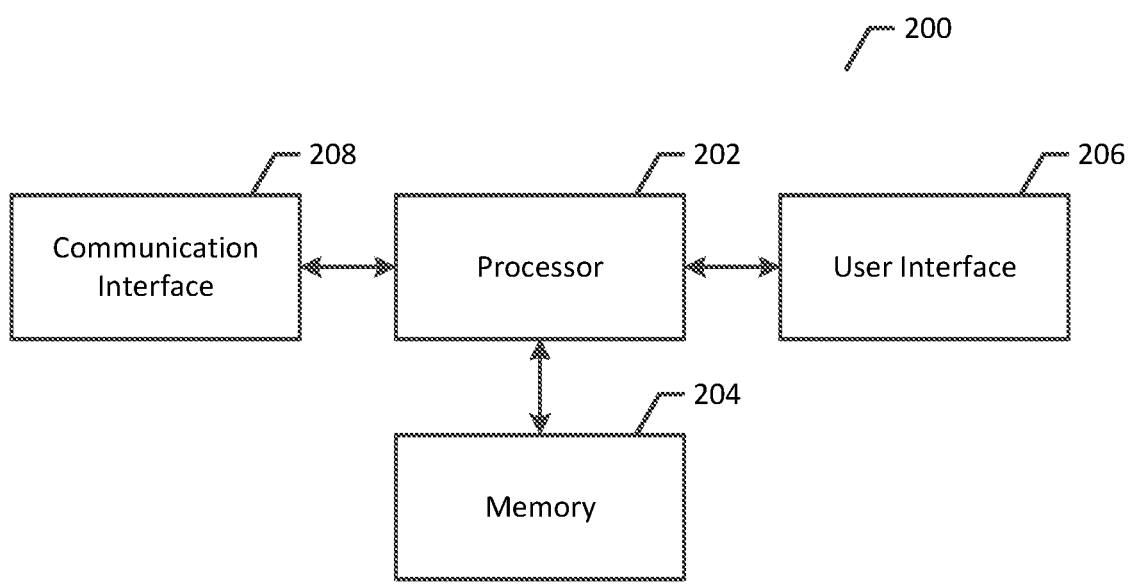
Figure 3:
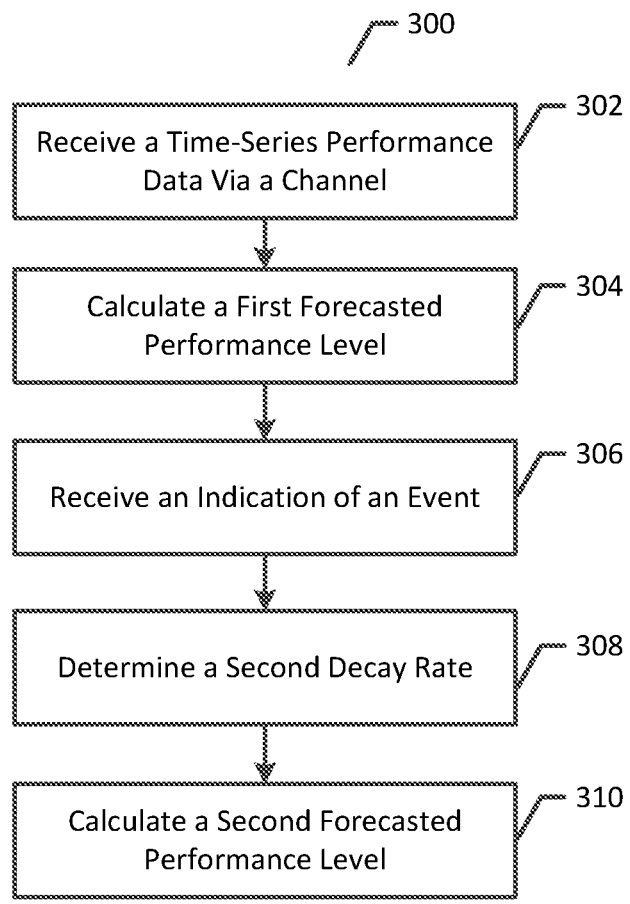
Figure 4:
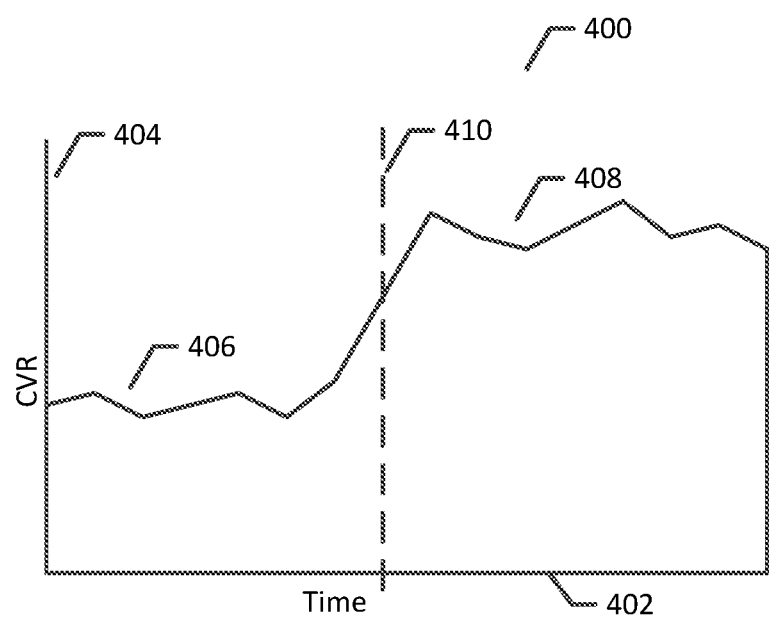

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing an example system using special-purpose circuitry in accordance with some embodiments of the present invention;

FIG. 3 illustrates an example data flow interaction between elements of an example device for adjusting and modifying forecasted performance level in accordance with some embodiments of the present invention; and FIG. 4 illustrates an example chart in which aspects of example determinations, calculations and results associated with embodiments of the invention may be visualized.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Various embodiments of the present invention are directed to improved apparatuses, methods, and computer readable media for adjusting and modifying a forecasted performance level associated with an option data object, such as a deal offer. Some example implementations contemplate the detection and/or other determination of the occurrence of an event reflecting a change to an operating parameter of the option data object and/or related system, and the calculation of a decay rate to be applied to a portion of time-series data associated with the performance of the option data object and/or related system prior to the event occurrence. In this regard, embodiments of the present invention provide systems, devices, and frameworks that employ the adjusted decay rate or rates to a portion of time-series data related to the event occurrence, resulting in an adjusted forecasted performance level that effectively takes into consideration the event occurrence and the underlying change in operating conditions associated with the event occurrence, such that predictive models using the time series data to not heavily weight information that no longer reflects the current operating conditions of an option data object or related system.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the term "conversion" refers to the selection of a particular option data object by a user. For example, in situations where option data objects take the form of deal offer associated with goods, services, and/or other resources offered by a source of such goods, services, and/or other resources, a conversion occurs when a user selects and/or otherwise chooses to participate in the particular deal offer.

As used herein, the term "conversion rate," abbreviated as "CVR," provides an indication of the efficacy of conversion. In some example implementations, a conversion rate of a particular option data object, reflects the number of conversions of the particular option data object during a particular period of time. For example, conversions could be measured on an hourly, daily, weekly, monthly, and/or other time basis. In some example implementations a conversion rate may be calculated such that it reflects the number of conversions that are performed when compared to the number of times an option data object is presented and/or otherwise made available to a set of users.

As used herein, the term "forecasted performance level" provides an indication of the predicted performance level of an option data object or related system in the future, such as an anticipated conversion rate of an option data object over an given time interval.

As used herein, "time-series data" refers to a series of data points of a particular variable that are indexed, listed, graphed, or otherwise presented in time order. Time-series data can be collected by monitoring and measuring the variable over time. In some example embodiments, the measurements can be made in a regular time intervals. For example, the variable can be the conversion rate of an option data object, a related system or platform may collect time-series data by monitoring the conversion rate every hour, and/or monitoring the times at which conversions occur, and grouping conversion within predetermined time intervals.

As used herein, the term "datastream" refers to a set of data, such as time-series data, which is passed from one system or system component to another, such as via a communication channel. In some example implementations, a datastream of time-series data may be calculated and expressed as:

$$\text{Datastream} = f(s, \Delta)$$

where "s" refers to each data point in the time-series data, and "Δ" refers to the time intervals among and between each said data point. Moreover, in some example implementations, it may be advantageous to send a datastream over a dedicated communication channel between system components and/or other pieces of network architecture.

As used herein, the term "decay rate" refers to a rate or other scaling factor that may be applied to a set of data that tends to decrease the effect that impacted set of data has on a predictive model. Some example implementations of embodiments of the invention contemplate the use of past performance data (such as the conversion rate of a deal offer or other option data object over the previous thirty days, or some other time period) as an input signal to a predictive model to predict the future performance of the option data object and/or related system. In such example implementations, a decay is applied to such past performance data to adjust the impact that older data may have on the predictive model. Typically, the application of a decay rate tends to cause older data to be less powerful in driving the predictive model. However, the decay rate may take the form of any function and need not be a single scaling factor or linear equation, and may reflect any function or protocol deemed useful in adjusting the relative weight of past data. In some example implementations, the decay rate may be manually applied to a set of data in order to account for variables that are not captured or observed in the said set of data. In other example implementations, a decay rate may be automatically applied through the operation of one or more system components following predetermined protocols.

Many particularly advantageous implementations of embodiments of the invention arise in contexts and situations that involve the transmission and presentation to a user of a mobile device of deal offers (such as offers to purchase goods, services, and/or other resources at a discounted price or in connection with other benefits, for example). In many such example implementations, the deal offers are ranked based on the forecasted performance level, which can be calculated using historical time-series data associated with the deal offer. One of the technical challenges that is typical in such contexts and situations involves the determination of the current predicated performance level of a deal offer when the available time-series data reflects performance characteristics of a deal offer or other option data object prior to the occurrence of an event that caused, for example, a change in an operating parameter of the system. In the context of option data objects in the form of deal offers, such a change in operating parameter may take the form of a change in price associated with the deal offer. However, it will be appreciated that any change in an operating parameter of an option data object or related system may have a significant impact on the appropriate weighting of time-series historical performance data of the option data object, in the sense that performance data associated with a previous set of operating conditions may be of very limited value in assessing the likely performance of the modified option data object.

This operational challenge is compounded when such changes occur frequently, resulting in a single set of time-series data that is nonetheless associated a deal offer or other option data object that has taken a number of forms and/or frequently undergone significant changes in operating parameters, which further hinders the determination of the forecasted performance level under whatever the current condition of the option data object may be.

Several factors tend to increase the likelihood that the forecasted performance level may be unduly influenced by outdated past performance data. One such factor is the general tendency for option data object sources (such as providers of deal offers and those responsible for setting the parameters of the exchange of goods, services, and/or other resources associated therewith) to periodically change the parameters of the deal offer to attempt to increase conversions. For example, a restaurant, retailer, and/or other deal offer source may choose to decrease the price of the deal offer to attract more customers, and/or increase the price to maximize profitability or limit demand for low-inventory items. When the price of a deal offer decreases, more customers are likely to select and/or otherwise convert the deal offer, which results in a higher conversion rate that is captured in the time-series data associated with that deal offer. And, vice versa, an increase in price may result in a lower conversion rate. If the determination of the forecasted performance level for the deal offer is made based on the time-series data that is associated with the deal offer prior to the price change or other event occurrence, the forecasted performance level may be inaccurate, at least in the sense that it does not necessarily reflect the anticipated performance of a deal offer or other option data object in its current state.

Another such factor that tends to contribute to this issue arises when a predictive model calculates the forecasted performance level based on time-series data prior to a change of an operating parameter of the system, without taking into account the effect that the change has on the time-series data. Many predictive models implicitly assume that the conversion rate associated with an option data object (such as a deal offer, for example) is solely affected by the passage of time, and do not contemplate that changes in other parameters (such as price) would affect the conversion rate. Consequently, such models are unable to recognize that a decrease of deal offer price may result in an increase of the conversion rate, or, more importantly, that an event, such as the change of an operating parameter of an option data object, may necessitate different treatment of past performance data prior to the event and past performance data that reflects performance after the event.

Another related, complicating factor involves the intensive requirements for data storage, computation time, and network traffic involved with the relevant predictive models. In some situations, data is aggregated into timed segments or "buckets" (such as on a daily basis for thirty days, and a monthly basis for year) to decrease the data storage, computation time, and network traffic demands. However, such aggregation can obscure when an event occurred, and require further identification of aggregated data sets that may be impacted by the event.

To solve and address these issues, example implementations of embodiments of the invention apply an adjusted decay rate to the portion of time-series data that relates to conversions and/or other option data object performance levels prior to the occurrence of the event. In doing so, such example implementations confront and solve at least two technical challenges: (1) reliably detecting the portion of time-series data that may be affected by the event, and (2) reflecting the effect that the event has on the time-series data when determining the forecasted performance level.

Some example implementations contemplate receiving an indication associated with the datastream regarding the occurrence of a change in an operating parameter. In such implementations, when the "change" (such as a price decrease of the deal offer) associated with the datastream has occurred, the predicative model receives an identification of the change and an identification of a time at which the change occurs. Upon receiving such an indication, the system adjusts and calculates a decay rate for the time-series data prior to the change of the operating parameter of the system.

When determining how to adjust the decay rate or other weighted value of time-series data prior to the occurrence of the relevant event, the predictive model may consider the existing, "normal" decay rate associated with the time-series data. In such implementations where the adjusted "decay rate" or other weighted value is applied to a portion of time-series data (such as through the operation of one or more predictive models), the time-series data may be "deboosted" or otherwise adjusted downward based at least in part on the relative price decrease of the deal offer during the time period associated with the time-series data.

The forecasted performance level may be calculated in a number of different manners. In many particularly advantageous implementations, the calculation of a forecasted or anticipated performance level of an option data object involves feeding past performance data and other characteristics of an option data object into one or more predictive models. In some example implementations, it may be advantageous to use a Gaussian Prior in calculating the base estimate of a deal. In some such situations, the prior may be heavily dependent on the approximate pricing of a deal (particularly when multiple different deals with similar pricing parameters are grouped together in a given predictive model, such that a subtle shift in the pricing of one deal may have a significant impact on its related forecast. In some situations, it may be advantageous to use a Naïve Baysian approximation to generate specific deal performance calculations. In some such situations, the approximation may be primarily and/or solely dependent on prior performance data of the deal under the assumption of a fixed conversion rate. In some situations, the value generated by the Gaussian Prior may be combined with the results of the Naïve Baysian approximation to generate a posterior estimate for the conversion rate of deal in the context of one more user features.

In some example implementations of the present invention, the predictive model may perform one function or apply one treatment to the portion of time-series, past performance data that relates to occurrences prior to the event (such as a change in an operating parameter of the system), and a second function or other treatment to time-series, past performance data that relates to occurrences after the event. In some such example implementations, it may be particularly advantageous to apply a decay rate to pre-event data that significantly decreases its importance to a predictive model.

FIG. 4 depicts an example diagram in which the time-series data and the effect that an event, such as a change in an operating parameter has on these time-series data may be more readily visualized. One of the goals of the example diagram is to illustrate that time-series data can be shifted upwards or downwards upon a change in an operating parameter. This can be particularly advantageous in situations where the time-series data is a deal offer, and the price of the deal offer is an important factor for consumers to determine whether to accept the offer. For example, the deal offer may be associated with a vacation package. When the price of the vacation package decreases, consumes are more likely to purchase the package, resulting in an increase of the conversion rate.

With reference to FIG. 4, the diagram 400 indicates CVRs of a deal offer over a period of time. The time axis 402 illustrates the timeline of which data points are observed. The CVR axis 404 illustrates the CVR of an option data object at its corresponding time point. Time point 410 indicates a time point in the time axis 402 when a change in an operating parameter occurs, such as a decrease in price or other event. In FIG. 4, for the purposes of clarity, various time-series data points are connected and shown as forming a curve. However, it will be appreciated that the time-series data may be discontinuous and/or visualized in another manner. As illustrated in diagram 400, time-series data points 406, which are observed prior to time point 410, have a lower average CVR than time-series data points 408, which are observed after time point 410. This can happen when the parameter that is changed at time point 410 is an important factor for conversion, such that changing the parameter in a particular manner tends to increase the conversion rate of an option data object.

As discussed in the previous example, many consumers may be concerned about the price when deciding which vacation package to purchase. When a vacation package to Guam is priced at $5,000, many consumer may prefer a cheaper alternative, resulting in a conversion rate of 1% associated with the vacation package. When the same vacation package is priced at $3,000, more consumers may be willing to purchase the vacation package, resulting in a conversion rate of 5%. If the predictive model uses the conversion rate of the vacation package priced at $5,000 to determine the forecasted performance level of the vacation package priced at $3,000, then the predictive model needs to take into consideration the price change; otherwise the forecasted performance level won't be accurate.

Referring back to FIG. 4, a problem exists as to how to quantitatively characterize the effect that the change occurred at time point 410 has on data points 406. Accordingly, provided herein is an apparatus, computer program product, and method aiming to solve this problem.

FIG. 1 shows an example system environment 100 in which implementations involving the efficient adjusting and modifying of data used to forecast a performance level of an option data object or related system calculate and the application of adjusted decay rates associated with time-series data prior to a change of parameter may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the adjusting and modifying forecasted performance level by calculating adjusted decay rates associated with time-series data prior to a change of parameter. Some such embodiments leverage a hardware and software arrangement or environment in accordance with the present invention.

As shown in FIG. 1, a predictive model system 102 includes a predictive model system module 102A which is configured to receive, process, transform, transmit, communicate with and evaluate time-series data and other information associated therewith, and related interfaces via a web server, such as predictive model system server 102B and/or predictive model device 102D. The predictive model system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, predictive model system 102 also includes predictive model system database 102C that may be used to store information associated with time-series data, decay rates associated with such time-series data, rule sets to be applied in connection with the adjustment and modification of forecasted performance levels provided thereby or associated therewith, viewer systems and/or information provided thereby or associated therewith, and/or other information related to the adjustment and modification of forecasted performance levels, which can be accessed by the predictive model system module 102A, the predictive model system server 102B, and/or the predictive model device 102D. While FIG. 1 depicts predictive model system database 102C as a single structure, it will be appreciated that predictive model system database 102C may additionally or alternatively be implemented to allow for storage in a distributed fashion and/or at facilities that are physically remote from the each other and/or the other components of predictive model system 102. Predictive model system 102 is also shown as including predictive model device 102D which may take the form of a laptop computer, desktop computer, or mobile device, for example, to provide an additional means (other than via a user interface of the predictive model system server 102B) to interface with the other components of predictive model system 102 and/or other components shown in or otherwise contemplated by system environment 100.

Time-series data and/or additional content or other information to be associated with one or more option data objects may originate from a content source system such as datastream system 104. A user of datasteam system 104 may use a datastream device 104B, such as a laptop computer, desktop computer, or mobile device, for example, to interface with a datastream module 104A to observe time-series data and/or information to be associated with time-series data, such as an indication of an event occurrence associated with the datastream, and/or other information to incorporate into and/or associate with the time-series data and otherwise be processed by predictive model system 102. While only one datastream system 104 is depicted in FIG. 1 in the interest of clarity, it will be appreciated that numerous other such systems may be present in system environment 100, permitting numerous content sources to develop and transmit content and other information associated with time-series data to predictive model system 102. In some instances, datastream system 104 may also incorporate a datastream server 104C. Such implementations may be particularly advantageous in situations where a predictive model system 102 interfaces with numerous other sources of datastreams, and applies one or more predictive models, through the interaction of datastream module 104A and datastream server 104C. For example, a plurality of datastreams may include CVR information related to the deal offer, which is then transmitted to the predictive model system 102. The predictive model system 102, in turn, generates a forecasted performance level of each deal offer. The forecasted performance levels of multiple deal offers may be shown in the viewer system 106 in the form of rankings of these deal offers.

As shown in FIG. 1, system environment 100 also includes viewer system 106, which comprises a viewer module 106A and a viewer device 106B. While only one viewer system 106 is depicted in FIG. 1 in the interest of clarity, it will be appreciated that numerous additional such systems may be present in system environment 100, providing rankings to numerous viewers, and communicating with the predictive model system 102. Viewer device 106B may comprise and/or incorporate a laptop computer, desktop computer, mobile device, or the like, for example, and is configured to interface with a viewer module 106A to interact with predictive model system 102.

Overall, and as depicted in system environment 100, predictive model system 102 engages in machine-to-machine communication with datastream system 104 and viewer system 106, via one or more networks, to facilitate the adjustment and modification of a forecasted performance level of an option data object, such as the application of an adjusted decay rate to past performance data to be used in conjunction with predictive models regarding such time-series data received from datastream system 104, and the transmission of related data (such as a ranked list of option data objects) to viewer system 106.

The system 102 according to some embodiments of the present invention may be embodied by one or more computing systems, such as apparatus 200 shown in FIG. 2. As illustrated in FIG. 2, the apparatus 200 may include a processor 202, a memory 204, user interface 206, and communications interface 208. The apparatus 200 may be configured to execute any of the operations described herein, including but not limited to those described in connection with FIG. 1, FIG. 3, and FIG. 4.

Regardless of the manner in which the apparatus 200 is embodied, the apparatus of an example embodiment is configured to include or otherwise be in communication with a processor 202 and a memory device 204 and optionally the user interface 206 and/or a communications interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor 202 may comprise user interface 206 configured to control at least some functions of one or more user interface elements such as a display and, in some embodiments, a speaker, ringer, microphone and/or the like. The processor 202 and/or user interface 206 comprising a processor may be configured to control one or more functions of one or more user interface elements through computer program instructions (e.g., software and/or firmware) stored on a memory accessible to the processor (e.g., memory 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 is a block diagram illustrating a set of operations 300 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 3 and depicted or otherwise contemplated therein.

Many example implementations of the operations 300, the various devices capable of performing the operations 300 and/or other embodiments of the invention are particularly advantageous in contexts where time-series data observed prior to the occurrence of a change in an operating parameter is taken into consideration in determining the forecasted performance level.

As such, and as shown at block 302, the apparatus 200 is capable of receiving, via a first channel, a datastream, wherein the datastream comprises a set of time-series data associated with a performance level of an option data object and/or related system. Example implementations of block 302 contemplate a predictive model system, such as the predictive model system 102, that may use past performance data associated with an option data object and additional option data object parameters that may be extracted from an option data object to predict an aspect of the future performance of the option data object. In some example implementations of block 302, the time-series data may be the CVR of a deal offer for a period of time. For example the apparatus 200 may receive a datastream with a set of time-series data at a predetermined frequency that reflects the number of conversions achieve during a particular time period. In some situations, price changes associated with a deal object or other option data object may be considered an intrinsic part of the option data object such that they may be used by other systems that interact with the option data object.

As shown at block 304, the apparatus 200 is also capable of calculating a first forecasted performance level, wherein the calculation of the first forecasted performance level is based at least in part on a portion of the time-series data associated with a predetermined period of time and a first decay rate associated with the set of time-series data. As noted above, particularly with reference to FIG. 4, the first decay rate associated with the set of time-series data can be a "normal" decay rate that has been historically applied to time-series data of the deal offer. Any approach to predicting a first forecasts performance level of an option data object may be used in connection with implementations of block 304. For example, it may be advantageous to use one or more predictive models in conjunction with past performance data and/or other option data object parameters to assess the likely future performance of the option data object. In such implementations, a predetermined decay rate may be applied to the past performance data such that the weight afford the past performance data tends to decrease as the data points within the past performance data age.

As shown at block 306, the apparatus 200 is also capable of receiving an indication of an event associated with the datastream, wherein the indication of the event comprises an identification of a change in an operating parameter of the option data object or related system and an identification of a time at which the change in the operating parameter occurred. In some example implementations, the operating parameter can be the price of a deal offer. Example implementations of block 306 contemplate that a predictive model apparatus, such as the prediction model device 102D, may receive an indication that the event has occurred at a time point, such as time point 410 as illustrated in FIG. 4.

As shown in block 308, the apparatus 200 is also capable of determining, based at least in part on receiving the indication of the event associated with the datastream, a second decay rate associated with the set of time-series data. As discussed herein, it may be particularly advantageous to apply a decay rate to data associated with conversions or other occurrences prior to the time at which the event occurred such that the older, pre-event data is rapidly discarded and/or discounted by the predictive model. In some example implementations, a predictive model apparatus, such as the prediction model device 102D, may be supplied with the second decay rate, and apply the second decay rate the data the CVR data points that are associated with times prior to the occurrence of a price change, for example.

As shown in block 310, the apparatus 200 is also capable of calculating a second forecasted performance level, wherein calculating the second forecasted performance level comprises applying the second decay rate to a portion of the time-series data, wherein the portion of the time-series data is associated with a time period prior to the time at which the change in the operating parameter of the system occurred. Any of the predictive models used in connection with example implementations of block 304, for example, may be used in connection with implementations of block 310. For example, the prediction model device 102D may generate a second forecasted performance level by applying the second decay rate to CVR data points observed prior to the change of price when generating the forecasted performance level of the deal offer or other option data object.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart supports combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory coupled to the processor, wherein the processor is configured to at least:

receive, via a network, a datastream, wherein the datastream comprises a set of time-series data associated with a performance level of a system, wherein the system is associated with an option data object, and wherein the option data object is associated with an option data object source;

calculate a first forecasted performance level, wherein the calculation of the first forecasted performance level is based at least in part on:
 a portion of the time-series data associated with a predetermined period of time; and
 a first decay rate associated with the set of time-series data;

receive, from the option data object source via the network, an indication of an event associated with the datastream, wherein the indication of the event comprises:
 an identification of a change in an operating parameter of the system; and
 an identification of a time at which the change in the operating parameter of the system occurred;

based at least in part on receiving the indication of the event associated with the datastream, determine a second decay rate associated with the set of time-series data; and calculate a second forecasted performance level, wherein calculating the second forecasted performance level comprises applying the second decay rate to a portion of the time-series data, wherein the portion of the time-series data is associated with a time period prior to the time at which the change in the operating parameter of the system occurred;

determine, based on at least the first forecasted performance level and the second forecasted performance level, a ranking of the option data object;

transmit, via the network to a user of a viewer system, a presentation of the option data object, wherein the presentation of the option data object includes one or more other option data objects, and wherein the presentation of the option data object presents the option data object and the one or more other option data objects based on at least the ranking of the option data object.

2. The apparatus of claim 1, wherein the set of times series data associated with a performance level of a system comprises a conversion rate associated with the option data object.

3. The apparatus of claim 2, wherein the conversion rate associated with the option data object is determined based at least in part on a comparison between a quantity of conversions of the data object and a quantity of presentations of the option data object to one or more users of the system.

4. The apparatus of claim 2, wherein the change in an operating parameter of the system comprises a change in an aspect of the option data object.

5. The apparatus of claim 4, wherein the first calculated performance level comprises a first anticipated conversion rate associated with the option data object.

6. The apparatus of claim 5, wherein the second calculated performance level comprises a second anticipated conversion rate associated with the option data object.

7. The apparatus of claim 1, wherein applying the second decay rate to a portion of the time-series data, wherein the portion of the time-series data is associated with a time period prior to the time at which the change in the operating parameter of the system occurred comprises reducing a weight associated with the portion of the time-series data.

8. A computer program product comprising at least one non-transitory computer-readable storage medium having computer-executable program code instructions stored therein, the computer-executable program code instructions comprising program code instructions configured to:
 receive, via a network, a datastream, wherein the datastream comprises a set of time-series data associated with a performance level of a system, wherein the system is associated with an option data object, and wherein the option data object is associated with an option data object source;
 calculate a first forecasted performance level, wherein the calculation of the first forecasted performance level is based at least in part on:
  a portion of the time-series data associated with a predetermined period of time; and
  a first decay rate associated with the set of time-series data;
 receive, from the option data object source via the network, an indication of an event associated with the datastream, wherein the indication of the event comprises:
  an identification of a change in an operating parameter of the system; and
  an identification of a time at which the change in the operating parameter of the system occurred;
 based at least in part on receiving the indication of the event associated with the datastream, determine a second decay rate associated with the set of time-series data; and
 calculate a second forecasted performance level, wherein calculating the second forecasted performance level comprises applying the second decay rate to a portion of the time-series data, wherein the portion of the time-series data is associated with a time period prior to the time at which the change in the operating parameter of the system occurred;
 determine, based on at least the first forecasted performance level and the second forecasted performance level, a ranking of the option data object;
 transmit, via the network to a user of a viewer system, a presentation of the option data object, wherein the presentation of the option data object includes one or more other option data objects, and wherein the presentation of the option data object presents the option data object and the one or more other option data objects based on at least the ranking of the option data object.

9. The computer program product of claim 8, wherein the set of times series data associated with a performance level of a system comprises a conversion rate associated with the option data object.

10. The computer program product of claim 9, wherein the conversion rate associated with the option data object is determined based at least in part on a comparison between a quantity of conversions of the data object and a quantity of presentations of the option data object to one or more users of the system.

11. The computer program product of claim 9, wherein the change in an operating parameter of the system comprises a change in an aspect of the option data object.

12. The computer program product of claim 11, wherein the first calculated performance level comprises a first anticipated conversion rate associated with the option data object.

13. The computer program product of claim 12, wherein the second calculated performance level comprises a second anticipated conversion rate associated with the option data object.

14. The computer program product of claim 8, wherein applying the second decay rate to a portion of the time-series data, wherein the portion of the time-series data is associated with a time period prior to the time at which the change in the operating parameter of the system occurred comprises reducing a weight associated with the portion of the time-series data.

15. A method for adjusting and modifying forecasted performance level, the method comprising:
 receiving, via a network, a datastream, wherein the datastream comprises a set of time-series data associated with a performance level of a system, wherein the system is associated with an option data object, and wherein the option data object is associated with an option data object source;
 calculating a first forecasted performance level, wherein the calculation of the first forecasted performance level is based at least in part on:
  a portion of the time-series data associated with a predetermined period of time; and
  a first decay rate associated with the set of time-series data;
 receiving, from the option data object source via the network, an indication of an event associated with the datastream, wherein the indication of the event comprises:
  an identification of a change in an operating parameter of the system; and
  an identification of a time at which the change in the operating parameter of the system occurred;
 based at least in part on receiving the indication of the event associated with the datastream, determining a second decay rate associated with the set of time-series data; and
 calculating a second forecasted performance level, wherein calculating the second forecasted performance level comprises applying the second decay rate to a portion of the time-series data, wherein the portion of the time-series data is associated with a time period prior to the time at which the change in the operating parameter of the system occurred;
 determining, based on at least the first forecasted performance level and the second forecasted performance level, a ranking of the option data object;
 transmitting, via the network to a user of a viewer system, a presentation of the option data object, wherein the presentation of the option data object includes one or more other option data objects, and wherein the presentation of the option data object presents the option data object and the one or more other option data objects based on at least the ranking of the option data object.

16. The method of claim 15, wherein the set of times series data associated with a performance level of a system comprises a conversion rate associated with the option data object.

17. The method of claim 16, wherein the conversion rate associated with the option data object is determined based at least in part on a comparison between a quantity of conversions of the data object and a quantity of presentations of the option data object to one or more users of the system.

18. The method of claim 16, wherein the change in an operating parameter of the system comprises a change in an aspect of the option data object.

19. The method of claim 18, wherein the first calculated performance level comprises a first anticipated conversion rate associated with the option data object and wherein the second calculated performance level comprises a second anticipated conversion rate associated with the option data object.

20. The method of claim 15, wherein applying the second decay rate to a portion of the time-series data, wherein the portion of the time-series data is associated with a time period prior to the time at which the change in the operating parameter of the system occurred comprises reducing a weight associated with the portion of the time-series data.

* * * * *